US010666773B2

(12) United States Patent
Bonaventure et al.

(10) Patent No.: US 10,666,773 B2
(45) Date of Patent: May 26, 2020

(54) METHOD AND DEVICE FOR ESTABLISHING MULTIPATH NETWORK CONNECTIONS

(71) Applicants: TESSARES SA, Louvain-la-Neuve (BE); UNIVERSITÉ CATHOLIQUE DE LOUVAIN, Louvain-la-Neuve (BE)

(72) Inventors: Olivier Bonaventure, Gembloux (BE); Gregory Detal, Thorembais-Saint-Trond (BE); Sébastien Barré, Martouzin-Neuville (BE)

(73) Assignees: TESSARES SA, Louvain-la-Neuve (BE); UNIVERSITÉ CATHOLIQUE DE LOUVAIN, Louvain-la-Neuve (BE)

( * ) Notice: Subject to any disclaimer, the term of this patent is extended or adjusted under 35 U.S.C. 154(b) by 0 days.

(21) Appl. No.: 15/758,452

(22) PCT Filed: Sep. 19, 2016

(86) PCT No.: PCT/EP2016/072132
§ 371 (c)(1),
(2) Date: Mar. 8, 2018

(87) PCT Pub. No.: WO2017/055122
PCT Pub. Date: Apr. 6, 2017

(65) Prior Publication Data
US 2018/0248984 A1    Aug. 30, 2018

(30) Foreign Application Priority Data
Sep. 30, 2015  (EP) .................................... 15187769

(51) Int. Cl.
*G06F 15/16*     (2006.01)
*H04L 29/06*     (2006.01)
*H04L 12/707*    (2013.01)

(52) U.S. Cl.
CPC ............ *H04L 69/163* (2013.01); *H04L 45/24* (2013.01); *H04L 69/14* (2013.01); *H04L 69/28* (2013.01)

(58) Field of Classification Search
CPC ....... H04L 69/163; H04L 45/24; H04L 69/14; H04L 69/28
(Continued)

(56) References Cited

U.S. PATENT DOCUMENTS

2013/0194963 A1 *   8/2013  Hampel .................. H04L 45/24
                                                                  370/254
2013/0195004 A1 *   8/2013  Hampel .................. H04L 69/16
                                                                  370/315
(Continued)

FOREIGN PATENT DOCUMENTS

WO    WO 2015/094043    *  6/2013   ............ H04W 80/06
WO       2015094043 A1    6/2015

OTHER PUBLICATIONS

Qiuyu Peng, Anwar Walid, and Steven H. Low. 2013. Multipath TCP algorithms: theory and design. In Proceedings of the ACM SIGMETRICS/international conference on Measurement and modeling of computer systems (SIGMETRICS '13). Association for Computing Machinery, New York, NY, USA, 305-316. (Year: 2013).*

(Continued)

*Primary Examiner* — Taylor A Elfervig
(74) *Attorney, Agent, or Firm* — Workman Nydegger

(57) ABSTRACT

According to an embodiment a method is disclosed for establishing a Multipath TCP connection comprising a first and second TCP connection between a client and a server. The client performs the steps of: sending a synchronization segment to the server indicative for a request to establish the first and second TCP connection, receiving a synchronization and acknowledgement segment from the server, estab-
(Continued)

lishing the first and second TCP connections, sending an acknowledgment segment to the server in order for the server to establish the first and second TCP connection.

15 Claims, 5 Drawing Sheets

(58) Field of Classification Search
USPC .......................................................... 709/227
See application file for complete search history.

(56) References Cited

U.S. PATENT DOCUMENTS

| | | | | |
|---|---|---|---|---|
| 2015/0215345 A1* | 7/2015 | Agarwal | ............... | H04L 69/163 |
| | | | | 709/227 |
| 2016/0183129 A1* | 6/2016 | Liu | ..................... | H04W 76/15 |
| | | | | 370/331 |
| 2016/0218960 A1* | 7/2016 | Sundarababu | .......... | H04L 45/08 |
| 2016/0309534 A1* | 10/2016 | Teyeb | ..................... | H04L 69/14 |
| 2017/0078206 A1* | 3/2017 | Huang | .................. | H04L 47/193 |
| 2018/0062979 A1* | 3/2018 | Zee | ........................ | H04W 80/06 |
| 2018/0184474 A1* | 6/2018 | Skog | ........................ | H04L 67/14 |
| 2019/0289477 A1* | 9/2019 | Huang | .................... | H04L 69/14 |

OTHER PUBLICATIONS

Chen et al., "A Measurement-Based Study of MultiPath TCP Performance over Wireless Networks," Proceedings of the 2013 Conference on Internet Measurement Conference, IMC '13, Jan. 1, 2013, pp. 455-468.

Ford et al., "TCP Extensions for Multipath Operation with Multiple Addresses," Internet Engineering Task Force, (IETF), Jan. 17, 2013, 64 Pages.

European Search Report from EP Application No. 15187769.3, dated Mar. 9, 2016.

International Search Report and Written Opinion from PCT Application No. PCT/EP2016/072132, dated Nov. 22, 2016.

* cited by examiner

Fig. 1 – PRIOR ART

METHOD AND DEVICE FOR ESTABLISHING MULTIPATH NETWORK CONNECTIONS

FIELD OF THE INVENTION

The present invention generally relates to field of Multipath network connections. More particular, it relates to the field of establishing Multipath network connections that operate under the Multipath TCP or MPTCP protocol. A version of the protocol is published by the IETF in RFC 6824.

When a client or initiating node has initiated and established a Multipath TCP connection with a server node, at least two different networking paths exist between the client and server. For a client application running on the client node and communicating with a server application running on the server node, the Multipath TCP connection appears to these applications as a single connection with a single remote networking interface.

BACKGROUND OF THE INVENTION

The Multipath TCP protocol specification further outlines how a Multipath TCP connection can be established. According to this protocol, first, a single TCP connection between the client and server is established by a handshaking mechanism. During this handshaking mechanism, information on the capabilities and support for the Multipath TCP are exchanged. If one or both of the networking nodes do not support the MPTCP protocol, the connection is maintained as a single TCP connection. If both networking nodes support MPTCP, the client node may initialise a second handshaking mechanism for establishing a second TCP connection, i.e., a TCP subflow or auxiliary TCP connection.

A problem with establishing an MPTCP connection according to the above protocol is the time delay for establishing the subflows. For example, at least two 3-way handshakes must be performed for respectively establishing the first TCP connection and then the auxiliary TCP connection. That means that at least six messages are exchanged before the MPTCP connection is fully operable and thus before the full bandwidth of the two connections can be used to transfer data. This is especially disadvantageous in situations where connections have a limited lifetime within which data must be transferred as fast as possible. This is for example the case for browsing applications and the connections established with web services by such applications.

SUMMARY OF THE INVENTION

It is an object of the present invention to overcome the above mentioned shortcomings and to provide a way to establish a MPTCP connection within a shorter time span.

This object is achieved, according to a first aspect, by a method for establishing a Multipath TCP or shortly a MPTCP connection between a client networking node and a server networking node; wherein the Multipath TCP connection comprises a first and one or more auxiliary TCP connections. The method comprises the following steps performed by the client networking node:
  sending a synchronization (SYN) segment to the server indicative for a request to establish the first and the one or more auxiliary TCP connections;
  subsequently receiving a synchronization and acknowledgement (SYN+ACK) segment from the server;
  subsequently establishing the first and the one or more auxiliary TCP connections;
  sending an acknowledgment segment (ACK) to the server in order for the server to establish the first and one or more auxiliary TCP connections.

Along this disclosure, a client networking node is to be understood as the networking node that initiates or requests a Multipath TCP or MPTCP connection. The server networking node is to be understood as the networking node that receives or serves the request. The client and server networking nodes are not necessarily the endpoints of a communication path. The MPTCP connection may also be established along a section of a communication path, for example between proxy servers or gateways.

The full MPTCP connection comprising the different subflows is thus established at the client side after the exchange of two messages, i.e., the initial synchronization segment and then the reception of the corresponding acknowledgment from the server. In other words, the client establishes the first and the one or more auxiliary TCP connections based on the synchronization segment and the received acknowledgment. There is thus no further need for additional handshaking messages to be exchanged.

At the server side, the full MPTCP connection is established after the exchange of the three messages, i.e., the initial synchronization segment, the acknowledgment together with synchronization segment from the server and then the acknowledgment from the client.

It is thus an advantage of the present invention that a Multipath TCP connection can be established by a single three-way handshake. The number of segments exchanged and the establishment delay is thus independent of the amount of auxiliary TCP connections.

Furthermore, the exchanged messages may be backward compatible with segments used in the current MPTCP protocol, i.e., respectively the SYN+MP_CAPABLE segment, the SYN+ACK+MP_CAPABLE segment and the ACK+MP_CAPABLE segment. While the message may be the same, the interpretation given to them by the client and server is different, and, therefore, the Multipath TCP connection (and its associated subflows) are established by just a single three-way handshake.

In the publication "A Measurement-based Study of Multipath TCP Performance over Wireless Networks" by Yung-Chih Che et al. in IMC '13 Proceedings of the 2013 conference on Internet measurement conference, page 455-468 another solution is suggested to the problem of the time delay in the MPTCP protocol. In section 4.1.2 of this publication, it is proposed to modify the current MPTCP implementation to allow a client to send SYN segments, that are part of the handshaking mechanism, simultaneously over each of its available communication paths to the server. This solution is different from the proposed method as there is still an exchange of messages over all communication paths before establishing the connections. There is thus still a three-way handshake performed per connection of the Multipath connection. Therefore, the amount of exchanged messages is higher and increases with the amount of auxiliary MPTCP connections. Furthermore, if one network path is slower than the others, it cannot be used to transmit data before the end of the handshake over this path.

Advantageously, the client comprises a first and one or more second networking interfaces. The first TCP connection is then established over the first networking interface and the one or more auxiliary TCP connections are then established over the respectively one or more second networking interfaces.

This is the most typical case where Multipath TCP connections are used. By establishing a connection to the server over several interfaces, several communication paths are obtained. These interfaces may correspond to physical networking interfaces, but also to virtual interfaces. The first connection may then for example use the IPv4 IP protocol and an auxiliary connection the IPv6 IP protocol.

According to an embodiment, the sending and receiving is then performed over the first networking interface.

In other words, the setup of the MPTCP connection is performed by only exchanging messages over the first networking interface. In this case, the auxiliary connections are setup without exchange of messages over the second interfaces. This is especially advantageous if the first connection is performed over a stable path, for example over a wired interface. This way the connection is established in a fast way. This is also especially advantageous when the performance of the other connections is already known. This is typically the case when other connections have already been established before such that the performance of the connection is already known and further exchange of messages is not necessary in order to estimate the performance.

Alternatively, the sending of a synchronization segment is performed over the first networking interface and the receiving of a synchronization and acknowledgement segment is performed over the one or more second networking interfaces. Other combinations are also possible. For the exchange of the three-way handshake messages, more than one interface is thus used. This is especially advantageous when the performance of one of the connections is not known. By sending one of the handshake messages over such an interface, an indication of the performance can already be made which is useful for the later MPTCP connection.

The first TCP connection may further be characterized by first addressing information of the client and of the server and the one or more auxiliary TCP connections may be characterized by second addressing information of the client and of the server.

As common for TCP, the addressing information may then comprise an IP network address and port number.

According to an embodiment of the invention, the synchronization segment from the client to the server comprises the first and second addressing information of the client.

In order for the server to establish the auxiliary TCP connections, it should know the addressing information used at the client side. According to this embodiment, this information is provided along with the synchronization segment from the client. This has the advantage than there is no real restriction on the second address information as it is fully communicated to the server.

According to an alternative embodiment, the method comprises the further step of sending the second addressing information of the client to the server over an out-of-band communication channel with the server.

In this case, the server does not receive the second addressing information in the handshake messages of the first or auxiliary TCP connection, but over a separate or alternative channel. For example, there may be a dedicated out-of-band connection between the client and server for exchanging the second addressing information. Such a connection may for example be a part of a management application running on both client and server. This is especially advantageous in the case where many MPTCP connections are setup between the client and the server.

According to another alternative embodiment, there is a predefined logical relationship for deriving the second addressing information.

In other words, the server may derive the second addressing information based on an agreement or rule on how to derive the second addressing information. For example, a mathematical relationship may exist between the first and second addressing information. Or, according to another example, the second addressing information may be derived from previous connections where the same second addressing information for identical first addressing information.

According to an embodiment the server corresponds to an Access Gateway and the client corresponds to a multi-homed Customer Premises Equipment (CPE). Both the Access Gateway and Customer Premises Equipment then reside within an access network.

In such a case, the CPE is typically referred to as multi-homed equipment because of the different networking interfaces and thus the different possibilities to connect to an access network. The Access Gateway provides wide area or internet access to devices within the access network, i.e., devices in the access network can access outside networks through the Access Gateway.

It is a further advantage to perform the above method in order to provide network access to multi-homed CPE because in such environment, where a lot of MPTCP communication sessions will be established between the CPE and the Access Gateway. By using the method according to the invention in such an access network the overall delay in establishing the connections and the amount of messages exchanged is heavily reduced.

In such an access network, the first Multipath TCP connection may for example be established over a wired subscriber line providing network connectivity between the CPE and the Access Gateway. Examples of wired subscriber line technologies are DSL or Digital Subscriber Lines such as ADSL and VDSL, cable lines and optical fibre. The auxiliary connections may then be established over wireless communication interface. This way, an auxiliary MPTCP connection is established over this wireless interface. The wireless interface may for example use a mobile data communication technology such as for example GSM, CDMA, GPRS, EDGE and LTE in order to establish the connection with the server node, i.e., with the Access Gateway.

According to a second aspect, the invention relates to a corresponding method for establishing a Multipath TCP connection between a client networking node and a server networking node. The Multipath TCP connection comprises a first and one or more auxiliary TCP connections; the method comprising the following steps performed by the server networking node:
  receiving a synchronization segment from the client indicative for a request to establish the first and the one or more auxiliary TCP connections;
  retrieving first addressing information for the first TCP connection from the synchronization segment;
  obtaining second addressing information for the one or more auxiliary TCP connections;
  sending a synchronization and acknowledgement segment to the client in order for the client to establish the first and the one or more auxiliary TCP connections;
  receiving an acknowledgment segment from the client;
  subsequently establishing the first and the one or more auxiliary TCP connections based on the first and second addressing information.

According to an embodiment, the synchronization segment from the client to the server comprises the second addressing information of the client and the obtaining step further comprises retrieving the second addressing information from the synchronization segment.

According to an alternative embodiment, the obtaining comprises receiving the second addressing information from the client over an out-of-band communication channel with the client.

According to a third aspect, the invention relates to a client networking node configured to perform the method according to the first aspect.

According to a fourth aspect, the invention relates to a server networking node configured to perform the method according to the second aspect.

According to a fifth aspect, the invention relates to a network comprising the client networking node according to the third aspect and a server networking node according to the fourth aspect.

According to a sixth aspect, the invention relates to a computer program product comprising computer-executable instructions for performing the method according to the first and/or second aspect when the program is run on a computer.

According to a seventh aspect, the invention relates to a computer readable storage medium comprising the computer program product according to the sixth aspect.

According to an eighth aspect, the invention relates to a data processing system programmed for carrying out the method according to first or second aspect.

DETAILED DESCRIPTION OF EMBODIMENTS

The present invention relates to the establishment of Multipath TCP connections. TCP is a connection-oriented transport protocol defined in RFC793. In TCP, a connection is created by exchanging three segments:
- a SYN or synchronization segment from the client to the server;
- a SYN+ACK segment or synchronization with acknowledgment from the server to the client;
- an ACK segment or acknowledgment from the client to the server.

With this three-way handshake, key information is negotiated about the TCP connection such as the utilisation of certain options and the initial sequence numbers. Once established, the connection is identified by the following information:
- the network address of the client;
- the network address of the server;
- the source port on the client;
- the destination port on the server.

Figure 1:
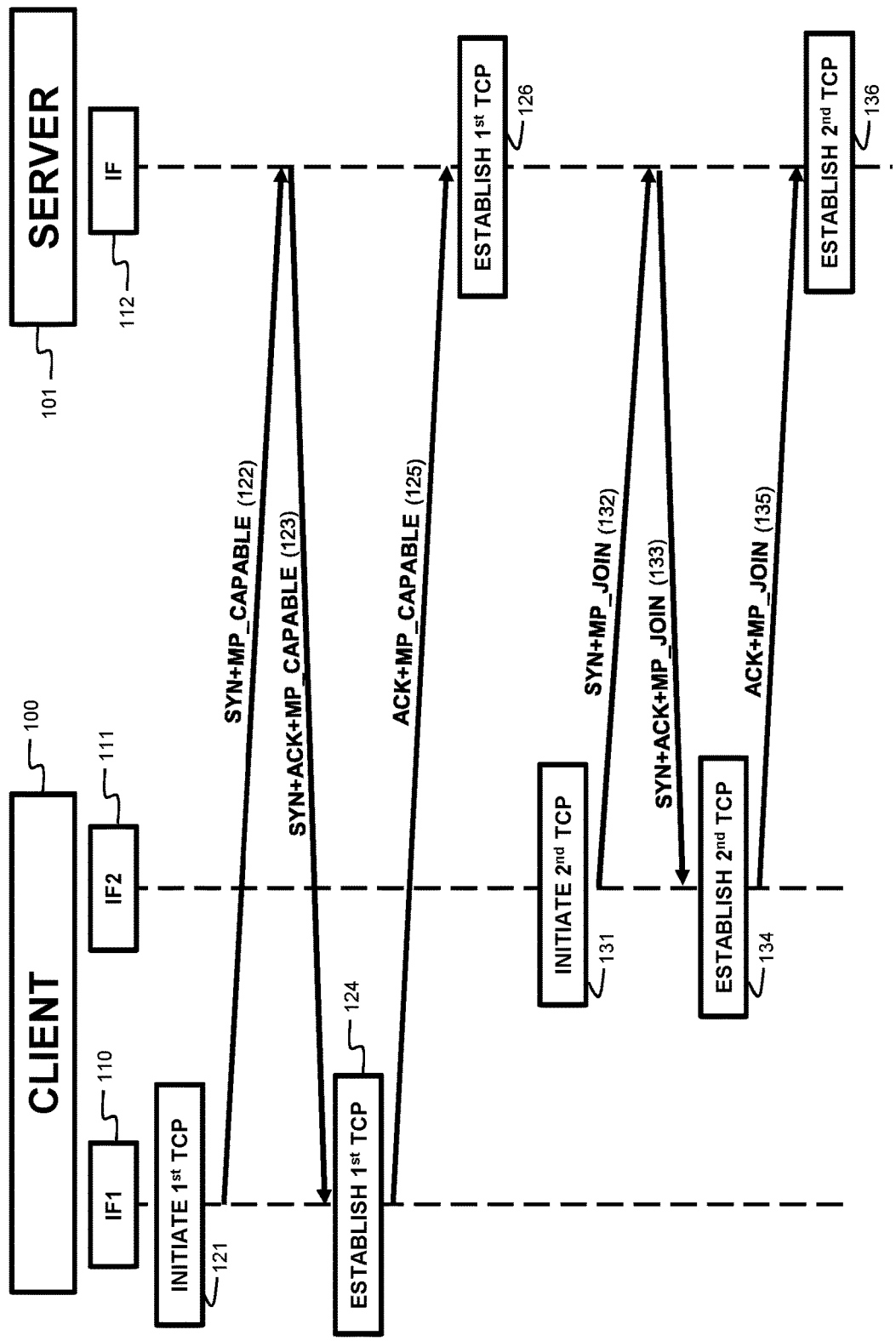
FIG. 1 illustrates a multiple 3-way handshaking mechanism for establishing a Multipath TCP connection according to the state of the art.

Multipath TCP is an extension to TCP defined in RFC6824. Multipath TCP allows a TCP connection to exchange data between client and server over multiple network paths by exchanging data over multiple TCP connections that appear to an application as a single TCP connection. A typical example of its application is a smartphone that is connected over both a WiFi and a 3G interface. To establish a Multipath TCP connection, several 3-way handshakes are used, i.e., one handshake per connection. This process is illustrated in FIG. 1 for a Multipath TCP connection comprising of a first and auxiliary TCP connection:

An application on the client 100 opens a TCP socket. Upon creation of the socket, the networking stack initiates in step 121 the setup of a first TCP connection by its first networking interface 100.

The client 100 sends a synchronization segment 122 in which it indicates that it has Multipath capabilities, shortly referred to as a SYN+MP_CAPABLE segment 122.

The server 101 receives the segment 122 over its networking interface 112 and now knows the addressing information of the client, i.e., the address and port number of the client for this first TCP connection.

The server acknowledges the segment 122 by returning a SYN+ACK+MP_CAPABLE segment 123. This segment also indicates that the server 101 supports Multipath TCP and comprises the addressing information of the server for the first TCP connection.

Upon reception of the segment 123, the client 100 establishes the first TCP connection.

Thereupon, the client 100 acknowledges the segment 123 by returning the ACK+MP_CAPABLE segment 125.

Upon reception of segment 125, server 101 establishes the first TCP connection.

Then, at some point in time, the client 100, i.e., the networking stack of the client 100, decides to initiate in step 131 the second or auxiliary TCP connection over a second communication path, i.e., over the second networking interface 111 of the client.

It does this by sending a SYN+MP_JOIN segment 132 to the server 101. This segment comprises the addressing information of the client for the auxiliary connection and also identifies that the auxiliary connection is part of the Multipath TCP connection.

In return, the server 101 sends a SYN+ACK+MP_JOIN segment 133 to the client's second networking interface 111.

Upon reception, the client now has the addressing information of the server for the auxiliary connection and establishes in step 134 the second or auxiliary TCP connection.

Thereupon, the client 100 acknowledges the establishment 134 by the ACK+MP_JOIN segment 135 to the server 101.

Upon reception of this segment 135, the server also establishes in step 136 the second or auxiliary TCP connection.

Figure 2:
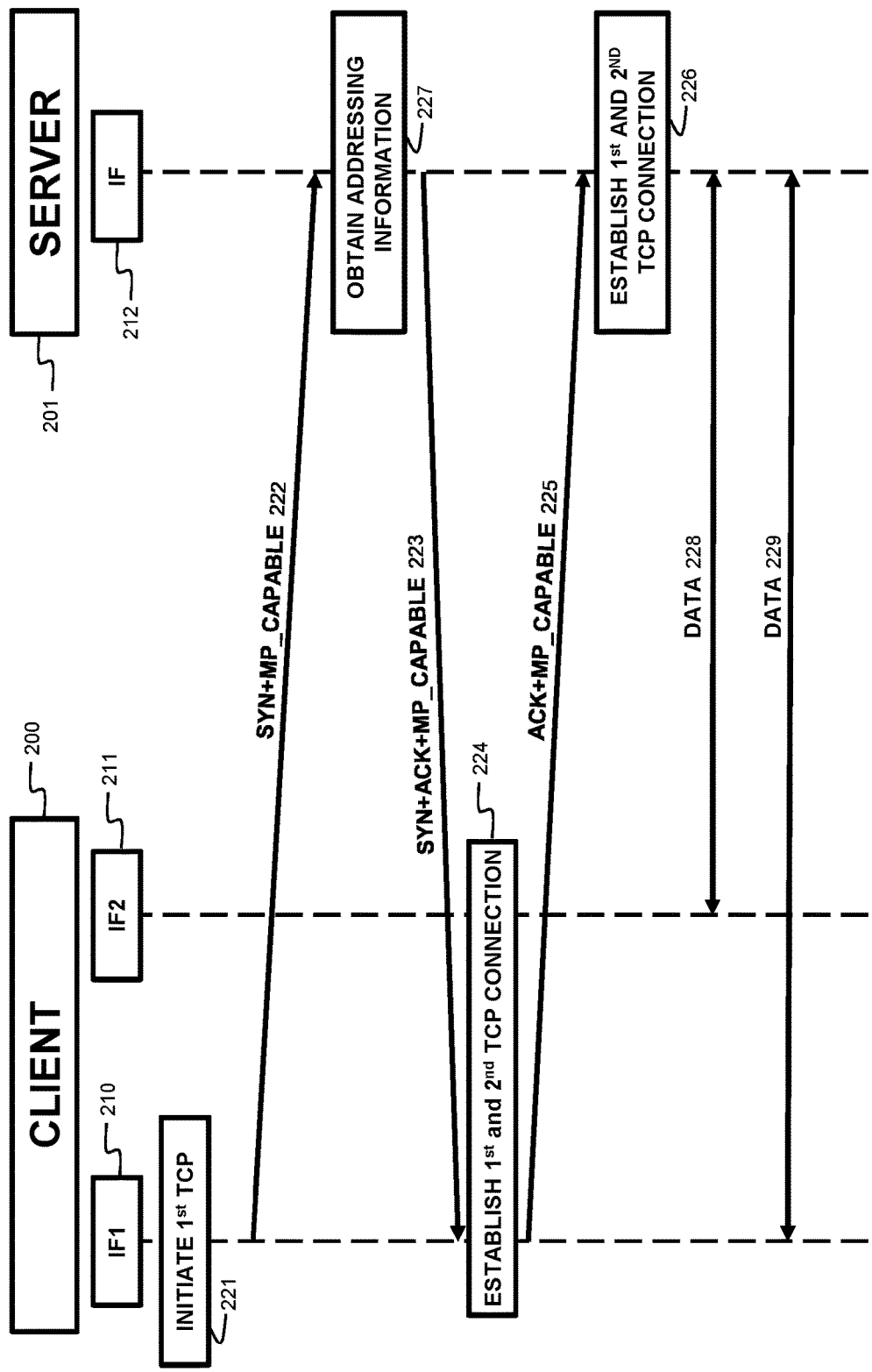
FIG. 2 illustrates a single 3-way handshaking mechanism for establishing a Multipath TCP connection according to a first embodiment of the invention.

FIG. 2 illustrates the establishment of a Multipath TCP connection between a client 200 and a server 201 according to an embodiment of the invention. The client 200 comprises two networking interfaces 210 and 211 for establishing the subflows of the Multipath TCP connection, i.e., the first TCP connection and the auxiliary TCP connection. At some point in time, an application running on the client 200 needs a TCP connection with server 201 and therefore opens a TCP socket with the server between the first networking interface 210 and the networking interface 212 of the server.

Upon the opening of the socket, the networking stack of the client 200 initiates in step 221 the first TCP connection of the Multipath TCP connection. In order to do so, the client sends an SYN+MP_CAPABLE segment 222 to the server's networking interface 212. The server then receives the segment 222 and retrieves the addressing information of the client from the segment 222, i.e., the network address and port of the networking interface 210. The server then also obtains under step 227 the addressing information of the client 200 of the auxiliary TCP connection of the Multipath TCP connection, i.e., the network address and port number of the second networking interface 211. There are different possibilities for doing so as further outlined below.

The reception of segment 222 is interpreted by the server as a request to setup the Multipath TCP connection, i.e., to setup both the first and auxiliary TCP connections. It is thus not only an indication that the client 200 supports Multipath TCP as is the case in the solution shown in FIG. 1. The request may be directly included in the first segment 222, for example by including it in segment 222. Alternatively, the request may also be done indirectly, for example by a predefined setting in the server that segments 222 should always be considered as such a request. This is particularly useful in controlled network environments where connecting clients and servers are known beforehand. The client 200 may also alter or set such a setting through an out-of-band connection or channel between the client and the server as set out further below.

When the request is included in segment 222, this may be done in several ways. One way is to define a new TCP option that includes such a request. Another possibility is to place the request inside the payload of the SYN segment. Yet another possibility is to place the request inside an option in the network packet, i.e., as an IP option. This is especially advantageous in IPv6 where there is no strict limit on the length of such an option and thus on the length of the request.

The server then replies with a SYN+ACK+MP_CAPABLE segment 223. This segment 223 acknowledges the reception of the first segment 222. As it originates form the server, it also comprises the addressing information from the server for the first TCP connection, i.e., the network address and port number. At that moment, the client 200 has thus a confirmation that the server 201 is ready for the Multipath TCP connection and that the server has all the information, i.e., the addressing information of the client for the first and auxiliary connections. Therefore, under step 224, the client 200 established both the first and auxiliary TCP connection.

Thereafter, the client 200 confirms the establishment with the ACK+MP_CAPABLE segment 225 to the server. Upon reception, the server has confirmation that the client 200 is ready for the Multipath TCP connection and also establishes the first and auxiliary TCP connections under step 226. Once the Multipath TCP connection has been setup on both client and server, data packets 228,229 may be exchanged between client 200 and server over both networking interface 210 and 211 and thus over both the first and auxiliary TCP connections.

According to the method illustrated in FIG. 2, the server 201 performs the step 227 for obtaining the addressing information of the client. According to embodiments of the invention, the obtaining the addressing information of the client for the auxiliary TCP connection may be performed in several ways as described below.

In a first way of performing the obtaining step 227, the addressing information is comprised in the SYN+MP_CAPABLE segment 222 and the server then retrieves this information from the segment. According to a first example a new TCP option is defined that includes this addressing information. According to a second example the addressing information is embedded as payload data in the SYN segment. According to a third example, the addressing information is embedded as an option in the network packet, i.e., as an IP option. This is especially advantageous in IPv6 where there is no strict limit on the length of such an option and thus on the length of the addressing information. The embedding of the addressing information may further be combined with the embedding of the request as outlined above. Preferably the addressing information is provided such that backwards compatibility with the MPTCP protocol is guaranteed.

In a second way of performing the obtaining step 227, the addressing information is provided by the client 200 to the server 201 by an out-of-band communication mechanism or channel, i.e., by communication between the server 201 and client 200 outside of the Multipath TCP connection or of the handshaking performed for establishing the Multipath TCP connection. For example, a separate connection may exist between client and server to exchange further information about the Multipath TCP connection. Such a connection may be used by management applications running on both the client 200 and server 201 that manage the establishment of the Multipath TCP connections.

In a third way of performing the obtaining step 227, the addressing information is independently derived by the server 201 by a predefined logical relationship for deriving the addressing information, i.e., according to a predefined rule indicating how the addressing information can be derived. Some examples of such a rules are:

There is a mathematical relationship between de network address and/or port of the client for the two connections. For example, the network address and/or port for the auxiliary connection may be obtained by incrementing the network address and/or port for the first connection.

The addressing information is identical as used for previous connections that used the same addressing information of the client for the first connection.

In any of proposed ways, if the client 200 sends the data packets 228, 229 to the server, the server is able identify the Multipath TCP connections to which the data packets belong by inspecting the address and port information in the data packets.

Figure 3:
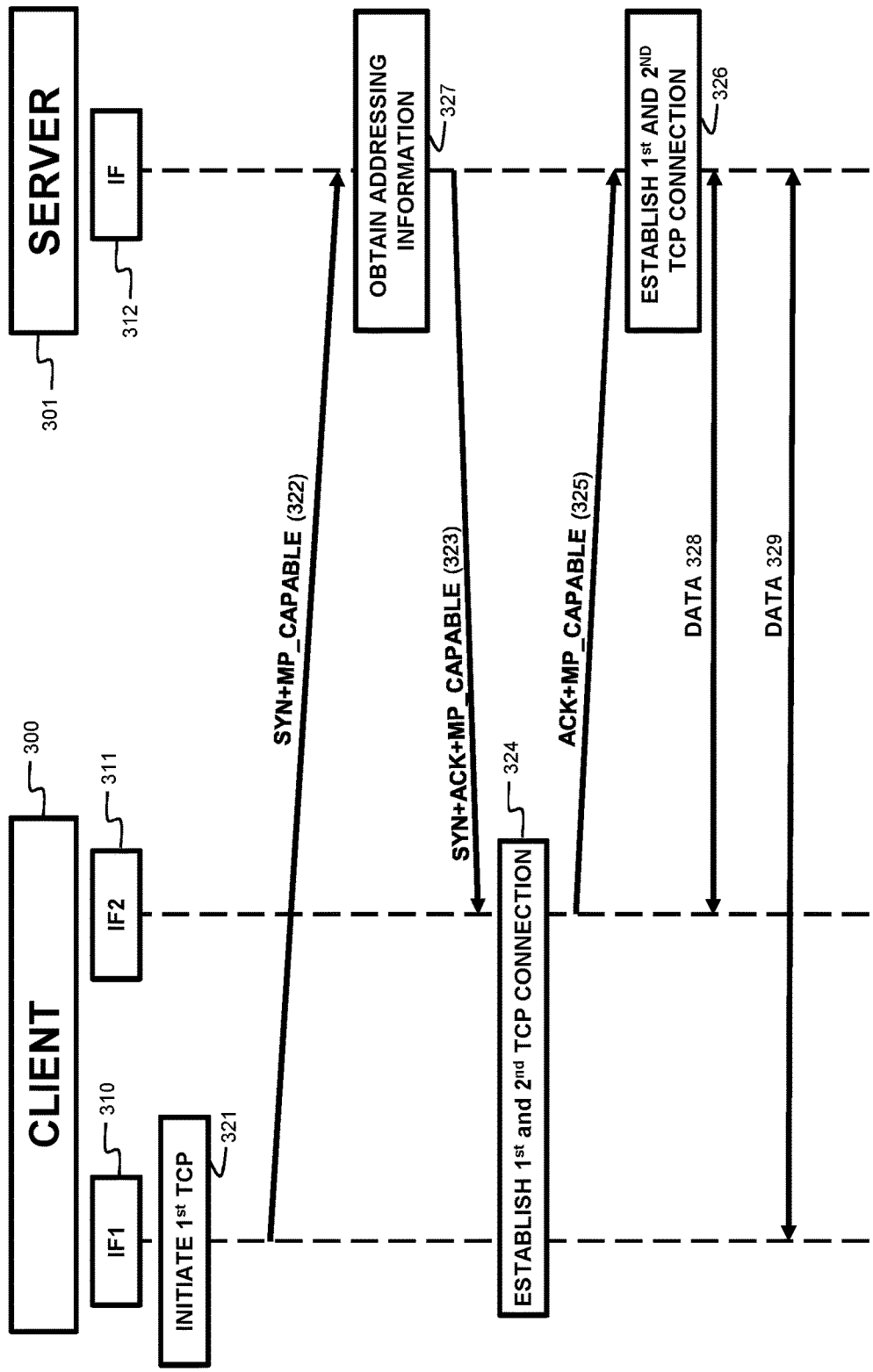
FIG. 3 illustrates a single 3-way handshaking mechanism for establishing a Multipath TCP connection according to a second embodiment of the invention.

FIG. 3 illustrates the establishment of a Multipath TCP connection between a client 300 and a server 301 according to an embodiment of the invention. The performed steps and exchanged segments are identical to the ones of FIG. 2. Only the differences between the two embodiments will now be described. According to this embodiment, the server 301 acknowledges the SYN+MP_CAPABLE segment 322 by the SYN+ACK+MP_CAPABLE segment 323. However, this segment 323 is now sent to the second networking interface 311, i.e., over the communication path for the auxiliary TCP connection. In order to do so, the server uses the addressing information for the auxiliary TCP connection that was obtained in the obtaining step 327. After the establishment 324 of the first and auxiliary connection, the client 300 then acknowledges the segment 323 by the ACK+MP_CAPABLE segment 325. This segment 325 is again sent over the second networking interface 311 to the server. Alternatively, segment 325 may be sent over the first networking interface 310. An advantage of this embodiment is that both the client and server may use the fastest path during the setup, i.e., during the 3-way handshake. The fastest path may further be different for client and server. This is typically the case if the links are asymmetric, for example when an asymmetric DSL link with a slow upstream is combined with a symmetric but expensive LTE network. Another advantage is that the client directly obtains the addressing information of the server 301 for the auxiliary connection.

According to further embodiments, the segments may also be redundantly exchanged over both connections at the same time. This improves stability because if one of the segments is dropped, the other redundant segment may still arrive. Furthermore, if the segment 222 or 322 is sent redundantly to the server in this way, the server directly obtains the addressing information of the client for both the first and auxiliary connection. This way, the obtaining steps 227 or 327 may be performed by just retrieving the addressing information from respectively each of the redundant segments.

According to a further embodiment, the server may further comprise more than one networking interface. In this case, the first TCP connection is setup between the first networking interface 210 or 310 of the client and a first networking interface of the server. Similarly, the auxiliary TCP connection is then setup between the second networking interface 211 or 311 of the client and a second networking interface of the server.

Figure 4:
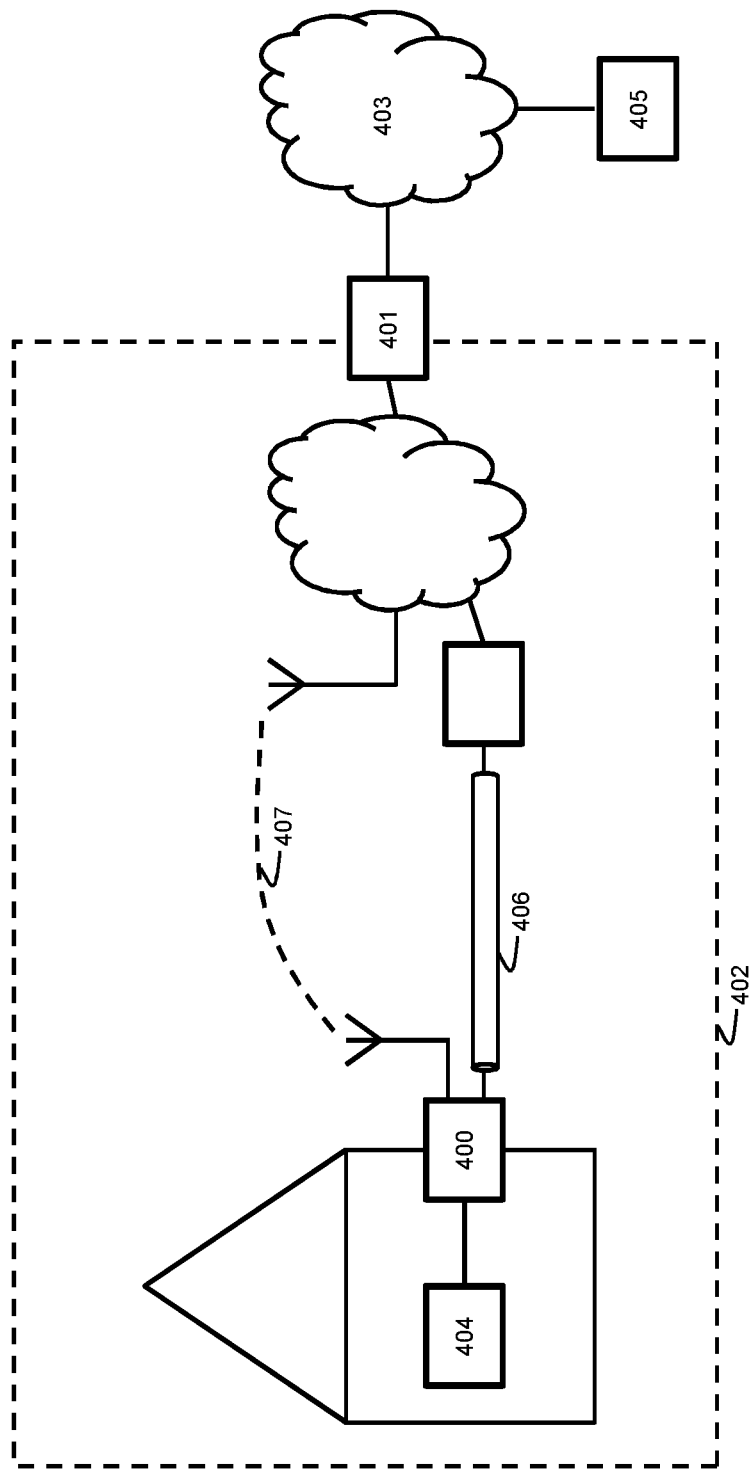
FIG. 4 illustrates an access network for providing network access comprising a client and server according to an embodiment of the invention.

According to a further embodiment, the client 200 or 300 and server 300 or 301 are further part of an access network for providing network access and thus internet access to customers. This is further illustrated in FIG. 4. The client 200 or 300 then corresponds to a Customer Premises Equipment 400 or shortly CPE. By the CPE 400, a network operator provides network access to a subscriber by the access network 402 to an outside network 403 such as for example the internet. The CPE 400 connects client devices 404 to the network 403 by more than one network interface, for example by a wired interface 406 and wireless interface 407. The server 201 or 301 further corresponds to an Access Gateway 401 or shortly AG that connects the outside network 403 with the access network 402.

By using the access network, a client device 404 may then setup a network connection with the server application 405. In order to increase the network bandwidth and reliability, a Multipath TCP connection is setup between the CPE 400 and the AG 401 according to the embodiments described above. As only one three-way handshake is needed to setup the Multipath TCP connection, the delay for doing so will be the same as for a normal single TCP connection. This way, the client device 404 will benefit from the increased bandwidth offered by the auxiliary connection without suffering from an increased delay for this bandwidth to become available.

According to yet another embodiment, the client device may correspond to a mobile communication device comprising a plurality of wireless network interfaces such as for example a WiFi interface and an interface for cellular data communication. A MPTCP connection may then be established over both these interfaces.

Figure 5:
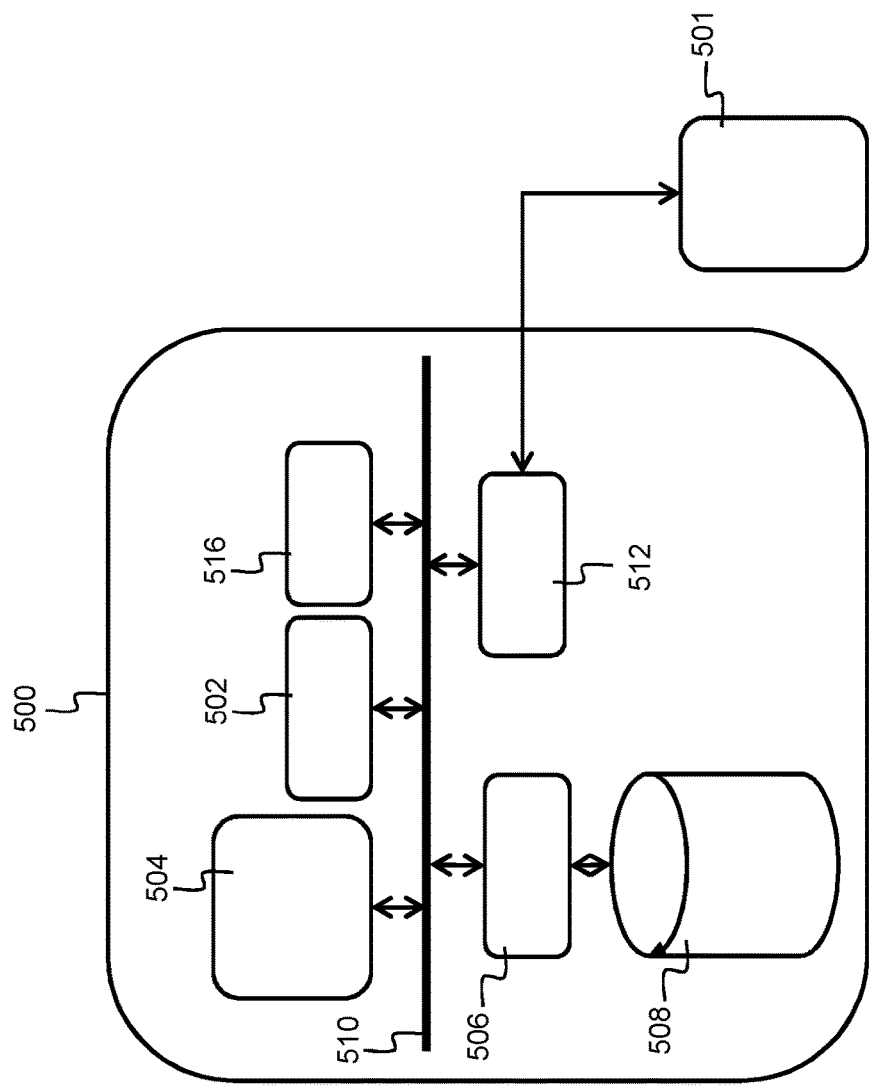
FIG. 5 illustrates a suitable computing system 500 as a further embodiment of the client and/or server according to FIGS. 2, 3 and 4.

FIG. 5 shows a suitable computing system 500 as a further embodiment of the client 200, 300, 400 or server 201, 301, 401. Computing system 500 may in general be formed as a suitable general purpose computer and comprise a bus 510, a processor 502, a local memory 504, one or more optional output interfaces 516, a communication interface 512, a storage element interface 506 and one or more storage elements 508. Bus 510 may comprise one or more conductors that permit communication among the components of the computing system 500. Processor 502 may include any type of conventional processor or microprocessor that interprets and executes programming instructions. Local memory 504 may include a random access memory (RAM) or another type of dynamic storage device that stores information and instructions for execution by processor 502 and/or a read only memory (ROM) or another type of static storage device that stores static information and instructions for use by processor 502. Storage element interface 506 may comprise a storage interface such as for example a Serial Advanced Technology Attachment (SATA) interface or a Small Computer System Interface (SCSI) for connecting bus 510 to one or more storage elements 508, such as one or more local disks, for example SATA disk drives, and control the reading and writing of data to and/or from these storage elements 508. Although the storage elements 508 above is described as a local disk, in general any other suitable computer-readable media such as a solid state drive or flash memory cards could be used. The system 500 described above can also run as a Virtual Machine above the physical hardware. The steps performed on the client and server devices according to the above embodiment may be partly or completely implemented as programming instructions to be run on processor 502. Communication interface 512 may further correspond to the client's or server's networking interfaces 210, 211, 212, 310, 311, 312, 406, 407. For example, when the system 500 is embodied as a client 200 or 300, it may communicate with server 501 over networking interface 512. The client will then comprise a plurality of such interfaces 512 for establishing the TCP connections.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for establishing a Multipath TCP connection between a client networking node and a server networking node, the Multipath TCP connection including a first TCP connection and one or more auxiliary TCP connections,
the method comprising the following steps performed by the client networking node:
sending a first message to the server, the first message including a synchronization segment indicative of a request to establish both the first TCP connection and the one or more auxiliary TCP connections;
subsequently receiving a second message from the server, the second message including a synchronization and acknowledgement segment from the server;
subsequently establishing the first TCP connection and the one or more auxiliary TCP connections;
sending a third message to the server, the third message including an acknowledgment segment for the server to establish both the first TCP connection and the one or more auxiliary TCP connections.

2. The method according to claim 1, wherein the client comprises a first and one or more second networking interfaces; and
wherein the first TCP connection is established over the first networking interface and wherein the one or more auxiliary TCP connections is established over the respectively one or more auxiliary networking interfaces.

3. The method according to claim 2, wherein the sending and receiving is performed over the first networking interface.

4. The method according to claim 2, wherein the sending a synchronization segment is performed over the first networking interface and the receiving a synchronization and acknowledgement segment is performed over the one or more second networking interfaces.

5. The method according to claim 1, wherein the first TCP connection is defined by first addressing information of the client and of the server; and wherein the one or more auxiliary TCP connections are defined by second addressing information of the client and of the server.

6. The method according to claim 5, wherein the synchronization segment from the client to the server comprises the first addressing information and the second addressing information of the client.

7. The method according to claim 5, further comprising the step of sending the second addressing information of the client to the server over an out-of-band communication channel with the server.

8. The method according to claim 5, wherein there is a predefined logical relationship for deriving the second addressing information.

9. The method according to claim 1, wherein the server corresponds to an Access Gateway and the client corresponds to a multi-homing Customer Premises Equipment; and
wherein the Access Gateway and Customer Premises Equipment are within an access network.

10. The method for establishing a Multipath TCP connection between a client networking node and a server networking node, the Multipath TCP connection including a first TCP connection and one or more auxiliary TCP connections,
the method comprising the following steps performed by the server networking node:
receiving a first message from the client indicative, the first message including a synchronization segment indicative of a request to establish the first TCP connection and the one or more auxiliary TCP connections;
retrieving first addressing information for the first TCP connection from the synchronization segment;
obtaining second addressing information for the one or more auxiliary TCP connections;
sending a second message to the client, the second message including a synchronization and acknowledgement segment for the client to establish both the first TCP connection and the one or more auxiliary TCP connections;
receiving a third message from the client, the third message including an acknowledgment segment;
subsequently establishing the first TCP connection and the one or more auxiliary TCP connections based on the first addressing information and the second addressing information.

11. The method according to claim 10, wherein the synchronization segment from the client to the server comprises the second addressing information of the client; and wherein the obtaining step comprises retrieving the second addressing information from the synchronization segment.

12. The method according to claim 10, wherein the obtaining comprises receiving the second addressing information from the client over an out-of-band communication channel with the client.

13. A client networking node configured to perform the method according to claim 1.

14. A server networking node configured to perform the method according to claim 10.

15. A system comprising a client networking node,
wherein the system is configured to establish a Multipath TCP connection between the client networking node and a server networking node,
wherein the Multipath TCP connection comprises a first TCP connection and one or more auxiliary TCP connections;
wherein the client networking node is configured to perform the following steps:
send a first message to the server, the first message including a synchronization segment indicative of a request to establish both the first TCP connection and the one or more auxiliary TCP connections,
subsequently receive a second message from the server, the second message including a synchronization and acknowledgement segment from the server,
subsequently establish the first TCP connection and the one or more auxiliary TCP connections,
send a third message to the server, the third message including an acknowledgment segment for the server to establish both the first TCP connection and one or more auxiliary TCP connections.

* * * * *